United States Patent
Cecur et al.

(10) Patent No.: US 7,159,551 B2
(45) Date of Patent: Jan. 9, 2007

(54) VALVE DEACTIVATION SYSTEM AND IMPROVED LATCHABLE HLA THEREFOR

(75) Inventors: Majo Cecur, Rivarolo Canavese (IT); Fabiano Contarin, Asti (IT)

(73) Assignee: Eaton Corporation, Cleveland, OH (US)

( * ) Notice: Subject to any disclaimer, the term of this patent is extended or adjusted under 35 U.S.C. 154(b) by 266 days.

(21) Appl. No.: 10/966,646

(22) Filed: Oct. 15, 2004

(65) Prior Publication Data
US 2005/0092273 A1    May 5, 2005

(30) Foreign Application Priority Data
Nov. 5, 2003    (EP) .................................. 03257008

(51) Int. Cl.
*F01L 1/18* (2006.01)
(52) U.S. Cl. ............................. 123/90.45; 123/90.16; 123/90.39
(58) Field of Classification Search ............. 123/90.15, 123/90.16, 90.17, 90.18, 90.2, 90.39, 90.44, 123/90.45
See application file for complete search history.

(56) References Cited

U.S. PATENT DOCUMENTS 6,321,704 B1    11/2001    Church et al. ........... 123/90.16
6,837,197 B1 *    1/2005    Cecur ...................... 123/90.16

* cited by examiner

*Primary Examiner*—Ching Chang
(74) *Attorney, Agent, or Firm*—Bradley J. Diedrich; L. J. Kasper (57) ABSTRACT

A deactivating valve control system for an internal combustion engine and, for each deactivating intake poppet valve (19D), there is provided a deactivating lash compensation device (37). Each of the devices (37) includes a latch member (83) biased toward an unlatched condition (FIG. 3) by a spring member 69, including a vertically-extending spring portion (73). In one embodiment (FIG. 1), the deactivation system includes an actuation rod (49) which is rotated to overcome the biasing force of the spring members (69) and move the latch members (83) into latching engagement (FIG. 5). In another embodiment (FIG. 7), an actuation wire (105) is reciprocated linearly to pivot a lever member (99) associated with each deactivating device (37), again to overcome the spring (69) and move the latch member (83) into latching engagement.

14 Claims, 7 Drawing Sheets

VALVE DEACTIVATION SYSTEM AND IMPROVED LATCHABLE HLA THEREFOR

BACKGROUND OF THE DISCLOSURE

The present invention relates to a valve control system for an internal combustion engine, and more particularly, to such a system of the type which can be used to deactivate the engine poppet valves of a number of different cylinders. The present invention also relates to an improved deactivating-type hydraulic lash adjuster (HLA) for use in such a valve control system.

Variable valve control systems of the valve deactivation type for engine poppet valves are already generally well known in the art. Although such valve deactivation type valve control systems can be applied to either the intake poppet valve, or the exhaust poppet valve, or both, it is most common to utilize such a valve deactivation system to select between the activated and de-activated conditions of only the intake poppet valves, and the invention will be described in connection with such a system.

Valve control systems of the type including "valve deactivation" capability are now well known to those skilled in the art. One embodiment of a valve deactivation control system is illustrated and described in U.S. Pat. No. 6,321,704, assigned to the assignee of the present invention and incorporated herein by reference. In the valve deactivation system of the cited patent, there is an HLA which may be operated in either: (a) a latched condition, in which case the rotation of the camshaft will result in normal valve lift, or (b) an unlatched condition, introducing lost motion into the valve gear train, whereby rotation of the camshaft will result in very little lift, or more commonly, no lift at all, of the particular intake poppet valve.

In order to gain a better understanding of the significance of the present invention, it is important to understand that most of the systems which have been referred to by the phrase "valve deactivation" have, in fact, been "cylinder deactivation" systems. In a cylinder deactivation system, only a portion of the cylinders are deactivated. For example, on a V-8 engine, it would be typical to provide valve deactivation capability for both the intake poppet valves, and the exhaust poppet valves, for two (the "deactivation" cylinders) of the four cylinders on each bank of cylinders. Therefore, as the engine speed and load increase and reach predetermined values, all of the valves for those two deactivation cylinders of each bank would be deactivated, such that the engine would then effectively operate on four cylinders (i.e., as a "V-4" engine) at highway speeds and low throttle loads. As is well known to those skilled in the art, in the example discussed above, the four cylinders still operating when the engine is cruising at highway speeds and low throttle loads are not provided with any means of deactivation (i.e., of either the intake or the exhaust poppet valves).

Cylinder deactivation, in which the effective displacement of the engine is reduced at cruising (highway) speeds, is utilized primarily to be able to improve fuel economy of the engine, at least over a portion of the engine operating cycle (i.e., at highway speeds and low engine loads). By way of contrast, a true "valve deactivation" system would be utilized on an engine of the type having two intake poppet valves for each cylinder. Although not an essential feature of the invention, it is typical on such engines (i.e., and particularly on direct fuel injection, Diesel type engines) that one intake poppet valve controls "swirl" while the other intake poppet valve controls "tumble". Those skilled in the art of internal combustion engines will understand the meaning of the terms "swirl" and "tumble" and therefore, no further explanation of those terms will be included herein. Although the present invention is not so limited, the valve deactivation system of the present invention was developed for use on an engine of the type described above, such that the valve deactivation system is utilized to deactivate the tumble intake valve for each and every cylinder, and the invention will be described in connection therewith.

In a typical, tumble intake valve deactivation system of the type to which the present invention relates, the tumble intake valve is deactivated while the engine is operating in a range anywhere from idle speed up to some predetermined engine speed (e.g., 2000–2500 rpm), and load (anywhere from 0–75%), as is well known to those skilled in the engine art. The deactivation of the tumble intake poppet valves is done to increase the turbulence within the combustion chamber, in order to achieve faster, and more complete, combustion, resulting in reduced emissions.

Typically, the various roller followers and HLA's which have been utilized in cylinder deactivation systems have been of the type which are spring biased into latching engagement, and the latch member is moved toward the unlatched condition (valve deactivated) by hydraulic pressure. Although this known arrangement for achieving deactivation of an engine poppet valve has proven to be generally satisfactory in its limited commercial usage, there are certain inherent disadvantages in such a system. With the unlatched condition being accomplished by pressurized engine oil, it thus becomes necessary to provide within the cylinder head two separate hydraulic circuits, one to achieve normal cylinder head lubrication (and lubrication of the valve gear train components), and the other hydraulic circuit to achieve unlatching of the latch members of the HLA's of the valve deactivation system. As will be understood by those skilled in the art, the circuit which performs the cylinder head lubrication may be simply a constant, pressurized source, and at a relatively low pressure. On the other hand, the hydraulic circuit utilized to achieve the unlatching of the latch members must be controllable on command, thus typically requiring at least one electrically controlled solenoid valve per cylinder head.

In addition, by utilizing a hydraulic circuit within the cylinder head to control the unlatching operation, the control logic for the deactivation system must now be able to take into account the changes which occur in certain system variables, such as oil pressure, oil temperature, and oil viscosity. In addition, any degradation in the condition of the oil (i.e., cleanliness, chemical composition, etc.) will have a negative impact on the operation of the unlatching system, as will the amount of air in the oil.

BRIEF SUMMARY OF THE INVENTION

Accordingly, it is an object of the present invention to provide an improved valve control system which overcomes the disadvantages of the prior art deactivation systems discussed above.

It is a more specific object of the present invention to provide an improved valve control system in which a plurality of engine poppet valves may be deactivated utilizing only a single actuator.

It is another object of the present invention to provide an improved valve control system which accomplishes the above-stated objects, and in which the actuator used to achieve the transition between the activated and deactivated modes is not required to be an especially high performance type of actuator.

It is still another object of the present invention to provide an improved deactivating-type hydraulic lash adjuster, for use in the improved valve control system of the present invention.

The above and other objects of the invention are accomplished by the provision of an improved valve control system for an internal combustion engine including a cylinder head having a plurality of intake and exhaust engine poppet valves for controlling the flow to and from a plurality of combustion chambers. A camshaft is rotatably supported relative to the cylinder head for providing cyclical input motion in response to rotation of the camshaft. One of the engine poppet valves for each of the plurality of combustion chambers comprises a deactivating engine poppet valve, and is operably associated with a valve end of a rocker arm, each of the rocker arms also including a fulcrum end disposed in engagement with a lash compensation device. Each of the rocker arms includes a cam follower disposed intermediate the valve end and the fulcrum end and is operable to pivot about a fulcrum surface defined by the lash compensation device in response to the cyclical input motion, thus transmitting cyclical opening and closing motion to the respective one of the deactivating engine poppet valves. Each of the lash compensation devices comprises a body member fixed relative to the cylinder head, a plunger assembly defining the fulcrum surface, and being moveable relative to the body member, and further includes a latch member. The latch member is moveable between a latched condition, and an unlatched condition, in which the plunger assembly is freely reciprocable relative to the body member.

The improved valve control system is characterized by each of the plurality of lash compensation devices including a spring member biasing the latch member toward one of the latched and unlatched conditions. An elongated actuation member is disposed adjacent each of the plurality of lash compensation devices and includes a portion operable to move each of the plurality of latch members toward the other of the latched and unlatched conditions, in response to actuating movement of the actuation member.

In accordance with another aspect of the present invention, an improved deactivating-type hydraulic lash compensation device is provided for use in a valve control system of an internal combustion engine including an engine poppet valve for controlling the flow to and from a combustion chamber. The lash compensation device comprises a body member adapted to be received within a bore defined by a housing, the body member being fixed relative to the housing. A plunger assembly is moveable relative to the body member, in a direction parallel to the axis of the device, and a latch member is moveable radially, relative to the axis, between a latched condition and an unlatched condition in which the plunger assembly is freely reciprocable relative to the body member. A spring member biases the latch member toward one of the latched and unlatched conditions.

The improved deactivating-type lash compensation device is characterized by the spring member being disposed, at least partially, external to the body member and including one portion thereof fixed relative to the body member and another portion thereof fixed to move radially with the latch member. The spring member biases the latch member radially outward, relative to the axis of the device, toward the unlatched condition. An actuation member is disposed adjacent the another portion of the spring member, and moveable between a first position engaging the another portion of the spring member and moving the latch member to the latched condition, and a second position out of operable engagement with the another portion of the spring member, permitting the latch member to be biased by the spring member to the unlatched condition.

DETAILED DESCRIPTION OF THE PREFERRED EMBODIMENT

Figure 1:
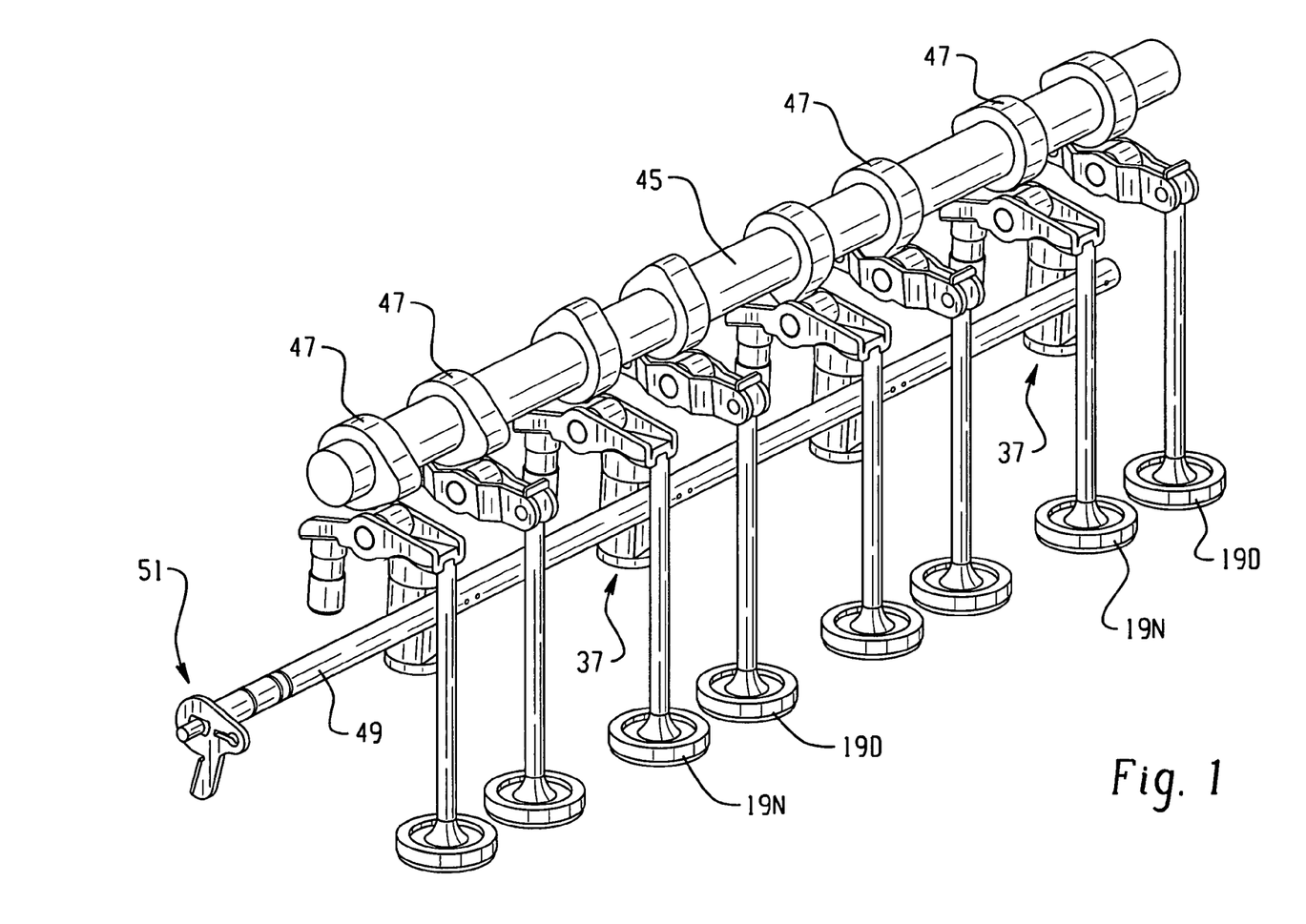
FIG. 1 is a somewhat schematic, perspective view of the valve control system of the present invention.
Figure 2:
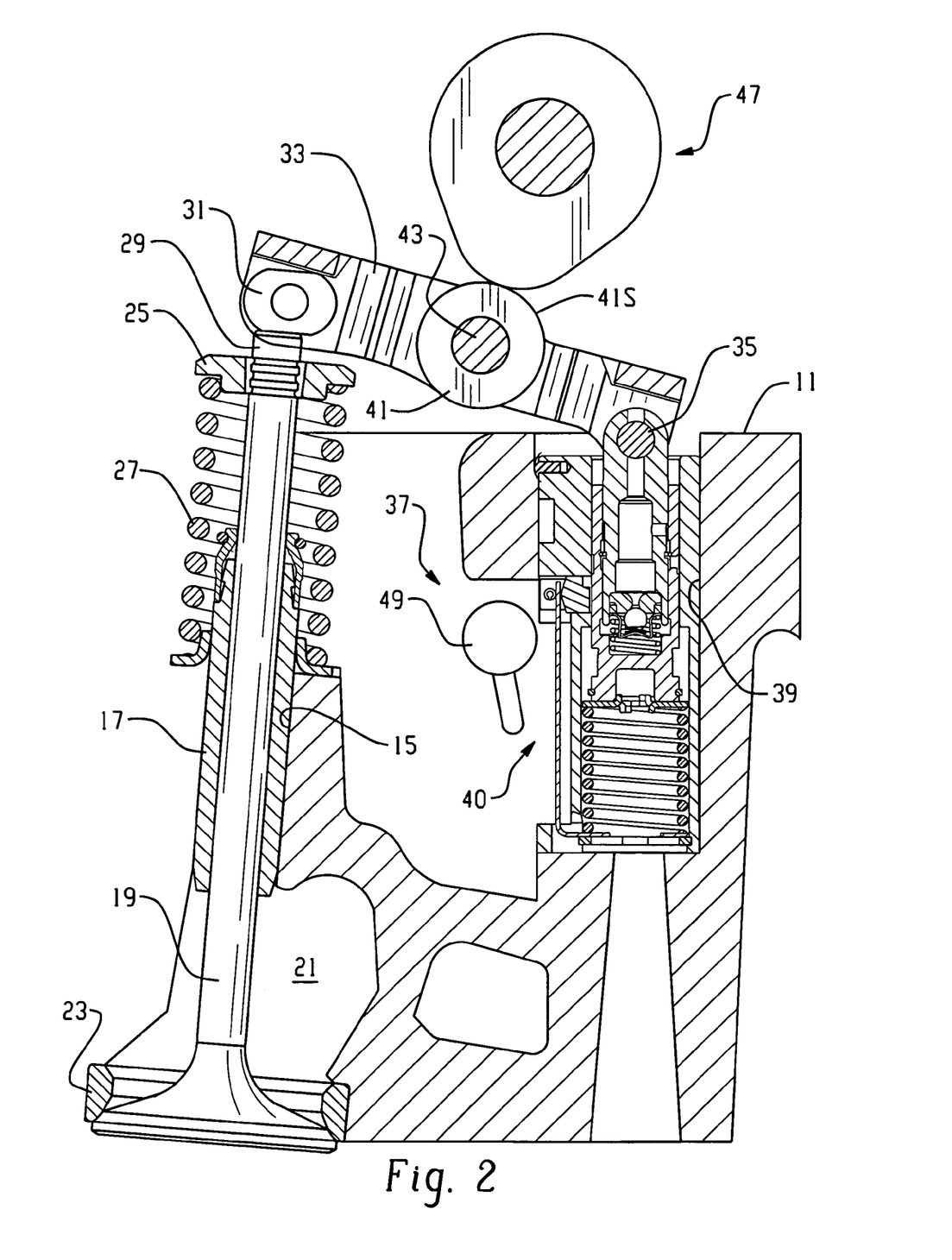
FIG. 2 is a fragmentary, transverse cross-section, illustrating an internal combustion engine cylinder head assembly utilizing the valve control system of the present invention, shown in its valve deactivation mode, and with the deactivating HLA shown in its unlatched mode.

Referring now to the drawings, which are not intended to limit the invention, FIGS. 1 and 2 taken together illustrate a valve actuation system made in accordance with the present invention. It should be noted that whereas FIG. 2 illustrates a cylinder head, generally designated 11, the cylinder head 11 is not shown in FIG. 1, in order to facilitate viewing all of the key components of the valve drive and control system of the present invention.

Referring now primarily to FIG. 2, as is well known to those skilled in the art, the cylinder head 11 typically defines the upper extent of a combustion chamber, designated 13 in FIG. 2. The cylinder head 11 defines a plurality of slightly angled bores 15, and disposed within each bore 15 is a valve guide 17 which supports, for reciprocable movement therein, an engine poppet valve 19. In the subject embodiment, and by way of example only, the valve control system is utilized to control only intake poppet valves, and therefore, as will be described in greater detail subsequently, all of the engine poppet valves 19 shown in both FIGS. 1 and 2 are intake poppet valves.

The cylinder head 11 defines an intake passage 21, only a portion of which is shown in FIG. 2, through which air (air only in Diesel engines) flows to the combustion chamber 13, whenever the intake poppet valve 19 moves from the closed position shown in FIG. 2 to an open position (displaced downwardly from the position shown in FIG. 2). Received within a recess defined by the lower surface of the cylinder head 11 is a valve seat insert 23 which, although not essential to the present invention, is typically utilized to provide an appropriate seat surface for engagement by the seat face of the poppet valve 19, as is well known to those skilled in the art. Thus, references hereinafter to valve "lift" will be understood to mean the downward movement of the poppet valve 19 from the closed position shown in FIG. 1 to an open position (i.e., wherein the valve is "lifted" from the valve seat insert 23).

The upper end of each poppet valve 19 includes a spring retainer 25, against which is seated a valve return spring 27, which biases the intake valve 19 upward, toward the closed position of FIG. 2. It should be understood that none of the details of those elements introduced so far are essential to the present invention, but are shown and described only by way of example.

In engagement with an upper end ("tip" portion) of the poppet valve 19 is a pivotable pad portion 31 which is disposed at a valve engaging end (or "valve end") of a rocker arm 33. At the opposite, axial end ("fulcrum end") of the rocker arm 33 is a pin member 35 which is received within openings in the opposite side walls of the rocker arm 33 in a manner generally well known to those skilled in the art, and which will not be described further subsequently. The pin member 35 provides a pivotable connection between the rocker arm 33 and a lash compensation device, generally designated 37. As is shown only in FIG. 2, the lash compensation device 37 is disposed within a bore 39 defined by the cylinder head 11, and as will be described further subsequently, the bore 39 differs from the typical cylinder head bore which receives an HLA. The bore 39, in the present invention, does not encompass the lash compensation device 37 about its entire circumference, over the full axial length of the bore 39, but instead, defines an open area or chamber, generally designated 40 in FIGS. 2 and 3, the function of which will be described subsequently.

Disposed intermediate the valve end (pad portion 31) and the fulcrum end (pin member 35), the rocker arm 33 includes a roller member 41 defining, on its outer periphery, a generally cylindrical cam follower surface 41S, the construction details of the roller member 41 not being essential aspects of the invention. Preferably, the roller member 41 is rotatably mounted relative to the rocker arm 33 by means of an axle shaft 43, as is conventional in the rocker arm art.

Referring now to FIG. 1, in conjunction with FIG. 2, the valve control system of the present invention includes a camshaft, generally designated 45 which, in accordance with the present invention, may be of any one of a number of conventional camshaft configurations and geometries, the details of which form no part of the present invention.

The valve control system of the present invention is being illustrated and described in connection with an engine in which, for each combustion chamber 13, there is provided a pair of intake poppet valves 19, one of which will serve as a deactivating intake valve, and thus bears the designation 19D, and the other of which is a non-deactivating intake valve, and thus bears the designation 19N. Therefore, what is shown in FIG. 1 is a valve control system for controlling a pair of intake poppet valves 19D and 19N, for each of a plurality (P) of cylinders (combustion chambers 13), wherein P equals four (in the subject embodiment, and by way of example only). Therefore, the valve control system illustrated in FIG. 1 could be viewed as the valve control system for the four deactivating intake poppet valves for an in-line four cylinder engine, or could be viewed as the valve control system for the four cylinders in one bank of a V-type eight cylinder engine. However, it should be understood by those skilled in the art that the valve control system of the invention is not limited to "P equals four" or any other particular number, nor is it limited to the valves 19D being intake valves, although such would be the conventional arrangement. All that is essential to the present invention is that there be a plurality of cylinders (combustion chambers 13) and at least one deactivating poppet valve 19D for each of those cylinders, and that the valve control system of the present invention controls all of the plurality P of poppet valves 19D in the manner to be described subsequently.

Referring now to both FIGS. 1 and 2, the camshaft 45 includes four pairs of cam lobes 47, and in the subject embodiment, and by way of example only, the cam lobes 47 of each pair may be substantially identical to each other, More typically, the cam lobes would not be identical, but the two valve lifts would be identical, especially if the two valve gear trains (conventional and deactivating) are different. The two cam lobes would normally have the same rotational orientation ("phase angle"). As is well known to those skilled in the art, each of the four pairs of cam lobes 47 has a different phase angle than each of the other of the three pairs of cam lobes 47 disposed on the camshaft 45. In accordance with one important aspect of the present invention, and as may best be seen in FIG. 1, there is an elongated actuation rod 49 which, in the subject embodiment, extends substantially the entire axial length of the cylinder head 11 and is at least about as long as the camshaft 45, and is oriented substantially parallel thereto. In FIG. 1, disposed at the far left end of the actuation rod 49 is a rotary actuator, generally designated 51, the function of which is to rotate the actuation rod 49 between its two different positions, to be described subsequently.

Referring still to FIGS. 1 and 2 together, and in accordance with another important aspect of the invention, the elongated actuation rod 49 is disposed adjacent each of the deactivating lash compensation devices 37 (see FIG. 2). As may best be seen in FIG. 2, and as was mentioned previously, the cylinder head 11 is configured such that the HLA 37 is not totally surrounded by the bore 39, over its entire axial length, but instead, the bore 39 would encompass only about two-thirds of the circumference of the HLA 37. The remainder of the circumference of the device 37 (i.e., the portion adjacent the actuation rod 49) has no portion of the cylinder head 11 immediately adjacent thereto. In other words, it is as if all of the portion of the cylinder head 11 (through which the actuation rod 49 passes) were "removed", thus exposing the adjacent portion of each of the deactivating lash compensation devices 37. It is one important aspect of the present invention that the actuation rod 49 have "access" to each of the devices 37, but the particular configuration shown in FIG. 2 is not an essential feature of the invention.

Figure 3:
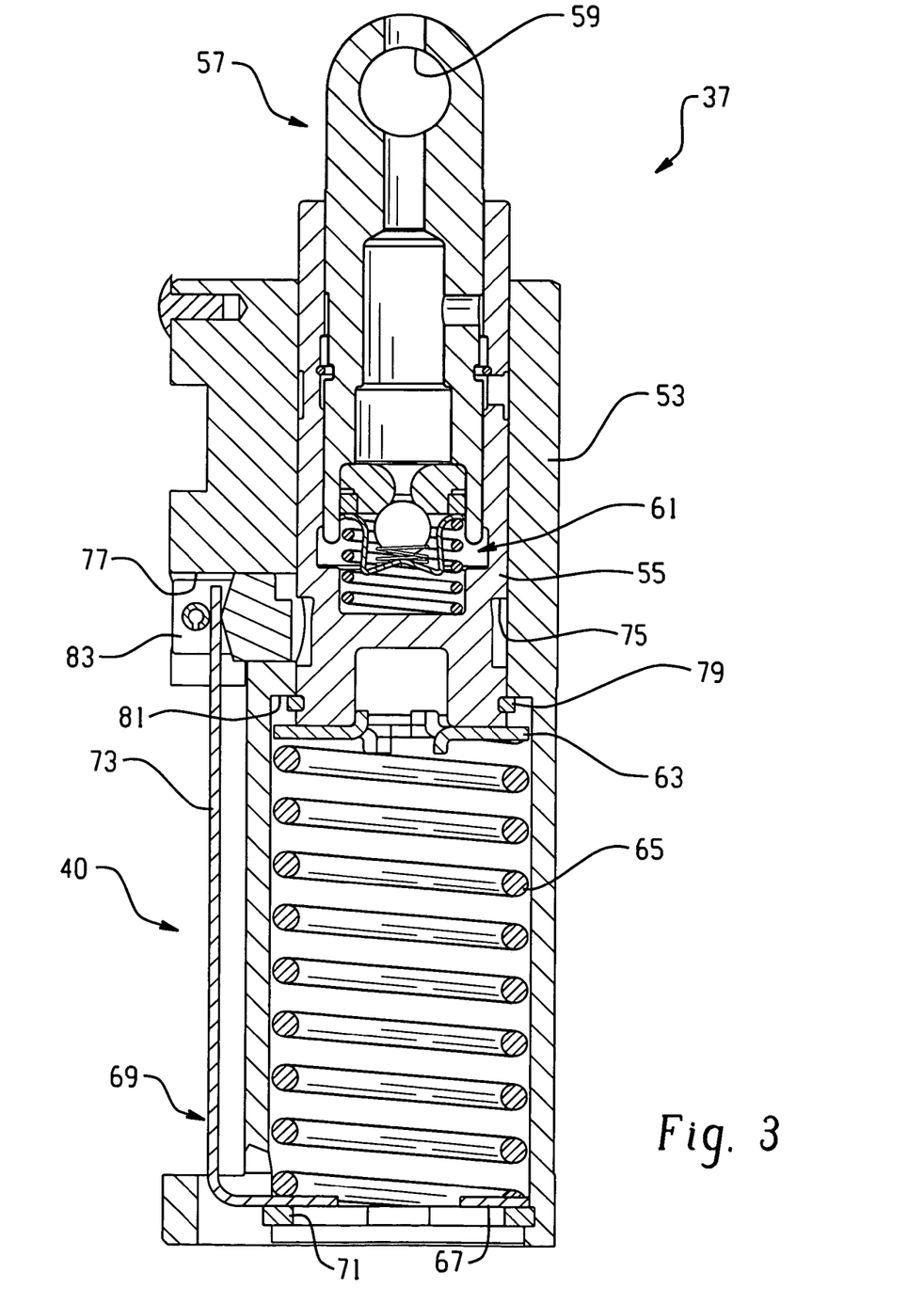
FIG. 3 is an enlarged, transverse cross-section of the latching hydraulic lash adjuster shown in FIG. 2, but shown in its fully extended condition, illustrating one important aspect of the present invention.

Referring now primarily to FIG. 3, the deactivating HLA 37 will be described in some additional detail. The deactivating HLA 37 includes an outer body member 53, an inner body member 55, and a plunger assembly, generally designated 57. In the particular embodiment shown, and by way of example only, the plunger assembly 57 defines a cylindrical opening 59 through which the pin member 35 extends, thus interconnecting the plunger assembly 57 to the "fulcrum end" (pin member 35) of the rocker arm 33. Thus, in the subject embodiment, the opening 59, which engages the pin member 35, comprises a "fulcrum surface" about which the rocker arm 33 pivots. Referring still primarily to FIG. 3, the plunger assembly 57 includes, toward the lower end thereof, a check valve assembly, generally designated 61, which is now well known to those skilled in the hydraulic lash compensation art. The construction details of the check valve assembly 61 form no essential part of the present invention, and therefore, the check valve assembly 61 will not be described further herein.

Disposed at the lower end in FIG. 3 of the inner body member 55 is a spring seat member 63 against which is seated the upper end of a lost motion spring 65. The lower end of the lost motion spring 65 is seated against an annular portion 67 of a spring member 69, the annular portion 67 being biased by the lost motion spring 65 against a retaining clip 71 which is received within a groove defined by the outer body member 53. Although the arrangement of the lost motion spring 65 is advantageous, for reasons which will become apparent subsequently, the invention is not limited to any particular lost motion spring configuration or arrangement.

The spring member 69 includes, in addition to the annular portion 67, a vertically extending spring portion 73, which in the subject embodiment, and for reasons which will become apparent subsequently, is disposed within the open area 40, defined by the cylinder head 11. Typically, the spring member 69 would be formed from a spring steel, and it is believed to be well within the ability of those skilled in the art to configure the spring member 69 to achieve its intended function and purpose, as will be described subsequently.

The inner body member 55 defines an annular groove 75, and the outer body member 53 defines a radially-oriented opening 77. As may best be seen in FIGS. 3 and 7 (which is an alternative embodiment, as far as means of actuation, but shows the same lash compensation device 37), the upper and lower portions of the outer body member 53 have a greater radial dimension than does the rest of the outer body member 53. The inner body member 55 includes some sort of retention clip 79 (shown herein as a Seeger ring which engages a shoulder 81 formed within the outer body member 53, thus limiting the outward (upward) movement of the inner body member 55, relative to the outer body member 53, under the influence of the lost motion spring 65.

Figure 5:
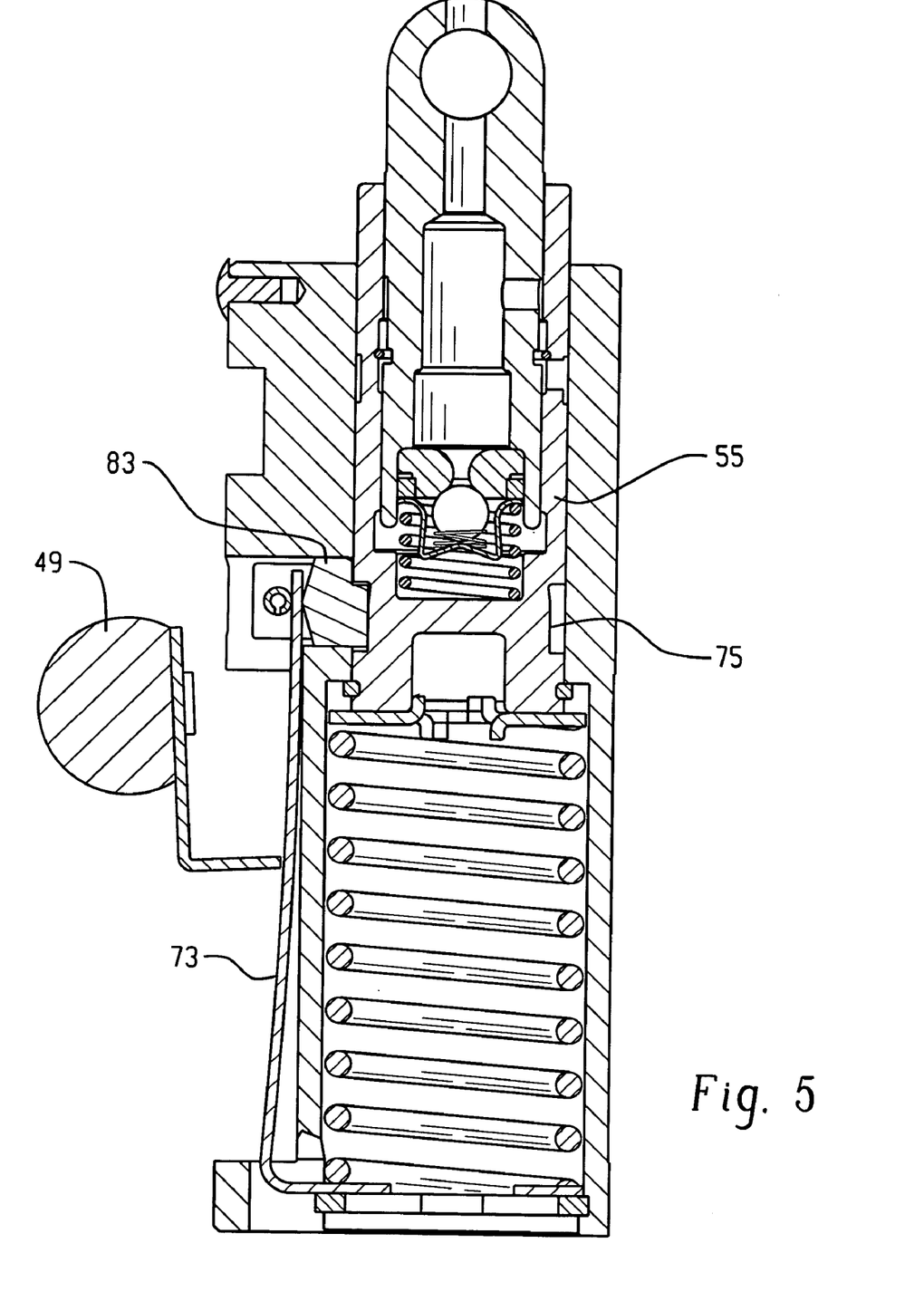
Figure 6:
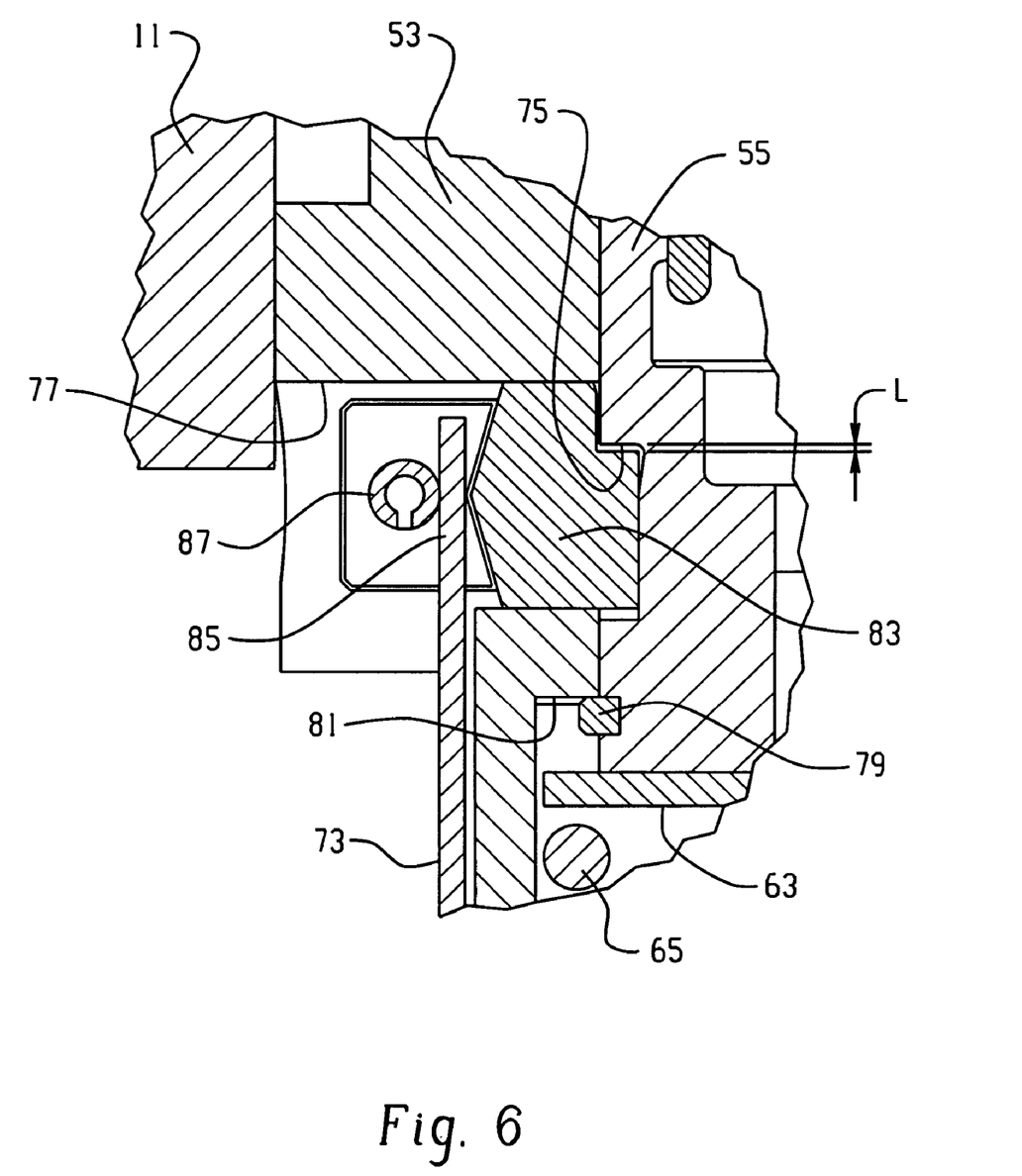
FIG. 6 is a fragmentary, greatly enlarged, transverse cross-section, of the latching operation, as it is occurring in the view of FIG. 5.

Referring still primarily to FIG. 3, with the inner body member 55 fully extended as shown (corresponding to the "base circle" condition of the HLA 37), the annular groove 75 is aligned with the opening 77 such that a latch member 83 is free to move between the unlatched condition of FIG. 3 and a latched condition as shown in FIGS. 5 and 6. Referring now also to FIG. 6, the vertically-extending spring portion 73 of the spring member 69 includes an upper end portion 85 which is trapped between the main part of the latch member 83 and a roll pin 87. In accordance with a preferred embodiment of the invention, the spring member 69 is constructed such that, in the absence of an actuating input, the spring portion 73 biases the latch member 83 to the left in FIGS. 3 and 6, toward an unlatched (deactivating) condition.

In a typical engine application for the valve control system of the present invention, at engine idle, and at relatively low engine speeds, the actuation rod 49 would be in the unactuated condition, shown schematically in FIG. 2, such that the spring member 69 would bias the latch member 83 to the unlatched condition, as described previously, and as is shown in FIGS. 2 and 3. Therefore, when the camshaft 45 rotates to such a position that the lift portion of each of the cam lobes 47 is in engagement with the cam follower surface 41S, the result is merely to move the fulcrum end of the rocker arm 33 downward, causing the plunger assembly 55 to retract (move "inward") in opposition to the force of the lost motion spring 65, as shown in FIG. 2. As the camshaft 45 rotates from the position shown in FIG. 2, such that the cam follower surface 41S is again in engagement with the "base circle" portion of the cam lobe 47, the lost motion spring 65 biases the plunger assembly 57 outward (relative to the outer body member 53) to the fully extended position shown in FIG. 3, with the retention clip 79 engaging the shoulder surface 81. Thus, with the engine operating at relatively low speed, each of the deactivating intake poppet valves 19D remains in the closed position shown in FIG. 2, and only the non-deactivating intake valves 19N open as the camshaft 45 rotates. As was noted previously, the non-deactivating intake valves 19N would typically comprise the "swirl" intake valves, while the deactivating intake valves 19D would typically comprise the "tumble" intake valves.

Figure 4:
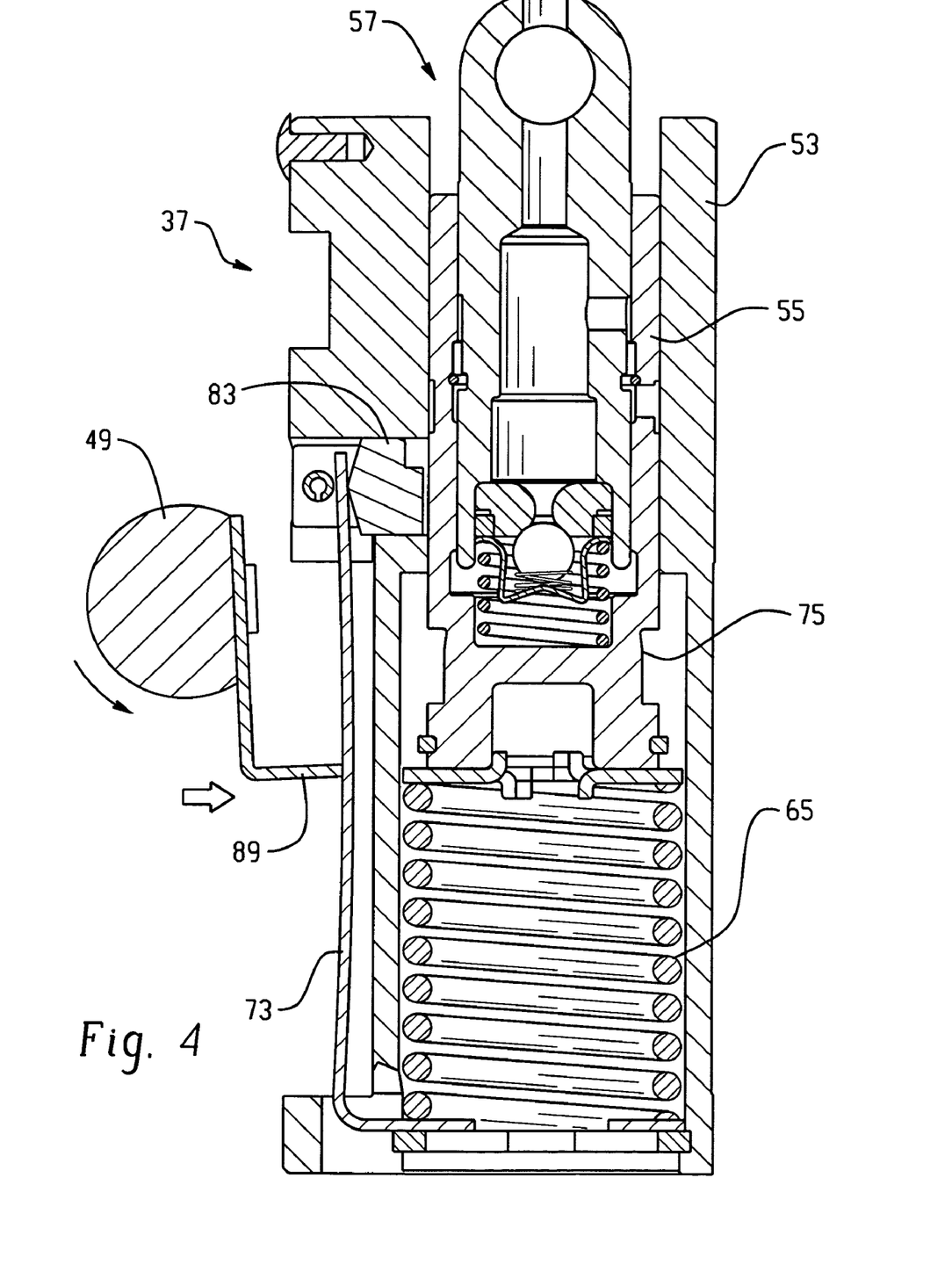
FIGS. 4 and 5 are transverse cross-sections, similar to FIG. 3, but on a somewhat smaller scale, illustrating the unlatched and latched conditions, respectively.

As the engine speed gradually increases, and eventually reaches a predetermined engine speed (probably, a selected speed, somewhere between 2000 rpm and 2500 rpm), an appropriate input is transmitted to the rotary actuator 51, thus rotating the actuation rod 49 in the counter-clockwise direction, as is indicated by the arrow in FIG. 4. Preferably, the actuation rod 49 is provided with an actuation tab 89 disposed immediately adjacent each of the vertically-extending spring portions 73. Therefore, in the subject embodiment, there would be four of the actuation tabs 89 disposed along the axial length of the actuation rod 49.

It will be understood by those skilled in the art that as the actuation rod 49 begins to rotate, the four deactivating lash compensation devices 37 will each be at a different phase or stage of its operating cycle. For example, in at least two of the devices 37, the plunger assembly 57 will be fully extended as shown in FIG. 3, while on one of the devices 37, the plunger assembly 57 will be fully retracted as shown in FIG. 2, and there will typically be one of the devices 37 in which the plunger assembly 57 is somewhere between the fully extended position of FIG. 3 in the fully retracted position of FIG. 2.

In accordance with one important aspect of the invention, there is no requirement, as there is on most deactivation systems, that the device provided for "actuating" (i.e., changing conditions of) the deactivation system be able to effect the change during the very brief time that its respective cam follower surface 41S is "on the base circle". Instead, utilizing the present invention, the rotary actuator 51 rotates the actuation rod 49 to the position shown in FIG. 4, and each of the actuation tabs 89 simultaneously engages the vertically-extending spring portions 73, overcoming the normal bias (to the left in FIG. 4) and biasing the upper end portion 85 of the spring and the latch member 83 to the right as shown in FIG. 4.

For those lash compensation devices 37 in which the plunger assembly 57 is, instantaneously, in either a fully retracted or a somewhat retracted position, as shown in FIG. 4, the radially inward bias applied to the latch member 83, indirectly, by the actuation tab 89, merely results in the latch member 83 engaging the outer cylindrical surface of the inner body member 55. As soon as the rocker arm 33 for that particular device 37 is again on the base circle, the lost motion spring 65 will bias the plunger assembly 57 outward (upward in FIGS. 4 and 5) to the fully extended position shown in FIG. 5. When the inner body member 55 reaches the fully extended position shown in FIG. 5, the "pre-bias" exerted on the latch member 83, as described previously, will result in the upper end portion 85 of the spring portion 73 biasing the latch member 83 into the annular groove 75, to the latched condition. Therefore, in the appended claims, references to the plunger assembly 57, in regard to the latching operation, will be understood to include the inner body member 55 (i.e., as part of the "plunger assembly"), in view of the fact that it is actually the inner body member 55 which is either engaged by, or not engaged by, the latch member 83.

As is well known to those skilled in the art, once the latch member 83 is in the latched condition, as shown in FIGS. 5 and 6, subsequent rotation of the camshaft 45 such that the lift portion of the cam lobe 47 engages the cam follower surface 41S will result in the rocker arm 33 pivoting about the fulcrum surface defined by the lash compensation device 37 (in this configuration, the cylindrical opening 59 and pin member 35). In the latched condition described, the result is downward movement (lift) of the deactivating intake poppet valve 19D, in opposition to the biasing force of the valve return spring 27. Therefore, at and above the predetermined engine speed, both the non-deactivating intake valves 19N, as well as the deactivating intake valves 19D, are fully open.

As may best be seen in FIG. 6, when the plunger assembly 57 is biased to its outward position (fully extended position), there is some mechanical lash, designated "L", between the annular groove 75 and the adjacent surface of the latch member 83. As is well known to those skilled in the art of latchable devices, such mechanical lash L must be provided to permit free movement of the latch member 83 from its unlatched condition to the latched condition, shown in FIGS. 5 and 6.

Figure 7:
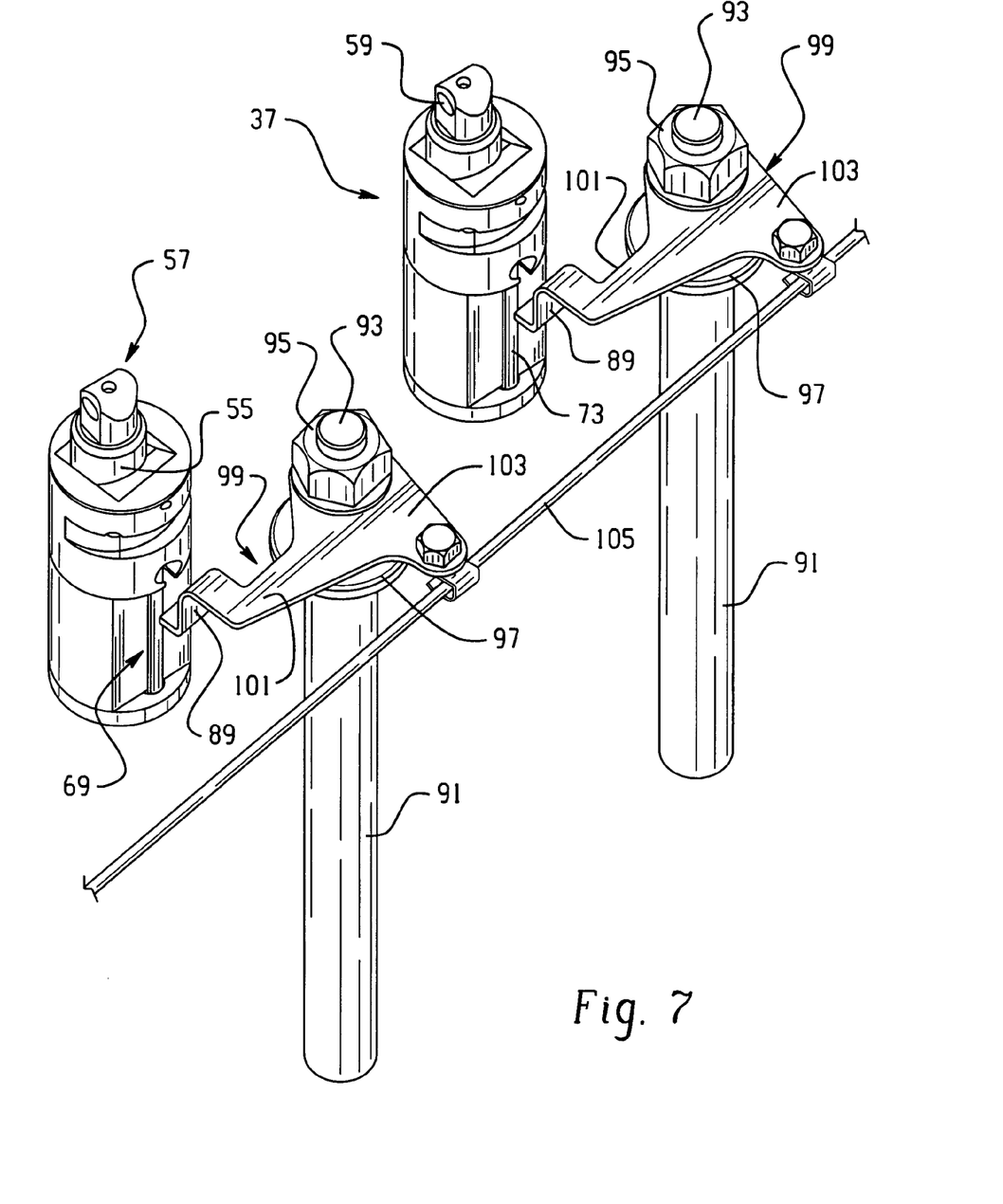
FIG. 7 is a somewhat schematic, fragmentary perspective view of an alternative embodiment of the valve control system of the present invention, on a substantially larger scale than FIG. 1, but viewed from approximately the same perspective.

Referring now primarily to FIG. 7, there will be described an alternative embodiment of the present invention, i.e., an embodiment which is an alternative to the deactivation system shown in FIG. 1. It should be noted, however, that in FIG. 7, each of the deactivating lash compensation devices 37 may be constructed to be substantially identical to what has been illustrated in FIGS. 2 through 6, as described previously.

The alternative deactivation system of FIG. 7 is intended for use in cylinder head applications in which there is insufficient space for the actuation rod 49 of the FIG. 1 embodiment, or wherein there are "obstacles" within the configuration of the cylinder head which prevent locating the actuation rod 49 immediately adjacent the lash compensation devices 37, as is generally required in connection with the deactivation system of FIG. 1.

In the alternative embodiment of FIG. 7, elements which are or may be the same as in the primary embodiment, will bear the same reference numerals, and new, or substantially modified elements will bear reference numerals in excess of "90". Disposed laterally adjacent each of the lash compensation devices 37 is a support post 91, preferably having its lower end in FIG. 7 fixed to the cylinder head 11. Each support post 91 terminates, at its upward end, in a threaded portion 93, having a nut 95 in threaded engagement therewith. In one developmental embodiment of the invention of FIG. 7, the support posts 91 are the bolts by means of which the cylinder head 11 is bolted to the engine block (not shown herein), in which case the "nut" 95 may be merely a hexagonal head used to tighten the bolt 91 relative to the block. It should be clearly understood that the invention shown in FIG. 7 is not limited to any particular arrangement for supporting or mounting the actuation structure, which will be described hereinafter.

On each of the support posts 91, below the nut 95, is a flange portion 97, and disposed between the nut 95 and the flange portion 97 is a stamped lever member 99. The lever member 99 includes a first lever arm 101 which terminates, at its "lower" end portion in FIG. 7, in the actuation tab 89, generally having the same configuration, disposed in the same relative location, and intended to accomplish the same function, as the actuation tab 89 shown in FIG. 4.

Each lever member 99 also includes a second lever arm 103, by means of which the lever member 99 may be clamped to an actuation wire 105, or attached thereto by any other suitable means, all of which are intended as part of the invention. As may be seen in FIG. 7, especially in conjunction with the right-hand lash compensation device 37, the actuation wire 105 is disposed to reciprocate linearly (i.e., move parallel to the access of the wire 105). Such reciprocation of the actuation wire 105 will have the effect of rotating each of the lever members 99 (about the axis of the support post 91), thereby moving all of the actuation tabs 89 into engagement with the vertically extending spring portions 73, in the same manner as shown in FIG. 4.

Preferably, at the far left end in FIG. 7 (to be consistent with FIG. 1), there is an actuation device, such as a vacuum actuator, which, in response to an input signal (i.e., a vacuum signal), can move the actuation wire 105 to the left in FIG. 7. Typically, there would be provided, at the right end of the actuation wire 105, a return spring (not shown), tending to bias the actuation wire 105 to the right in FIG. 7. Those skilled in the art will understand that the particular arrangement of actuator and return spring is not an essential feature of the embodiment of FIG. 7, but instead, all that is essential, is that there be provided some sort of lever arm mechanism which can translate linear, reciprocable movement of an actuation wire into "radial" movement (relative to the lash compensation devices 37) of the actuation tabs 89.

In regard to the system shown in FIG. 1, it is apparent that the actuation rod 49 would preferably be provided with a straight, unobstructed, open area in the cylinder head 11, to accommodate the actuation rod 49. However, it is one particular advantage of the alternative embodiment FIG. 7 that, in a cylinder head configuration where it is not feasible to provide such a straight, unobstructed path, deactivation of the devices 37 may still be accomplished, using the actuation wire 105. If, for example, there is an obstruction between the second and third cylinders of a four cylinder head or bank, the head may be provided with a guide opening or tube (between the second and third cylinders) which deviates from the nominal linear path of the wire 105, to get around the obstacle. The guide opening or tube (not shown herein) would support the actuation wire 105 for reciprocal movement therein, even if there is rubbing contact between the wire 105 and the tube. Thus, it may be seen that the alternative embodiment provides the engine and cylinder head designer with greater packaging flexibility.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A valve control system for an internal combustion engine including a cylinder head having a plurality of intake and exhaust engine poppet valves for controlling the flow to and from a plurality of combustion chambers; a camshaft rotatably supported relative to said cylinder head for providing cyclical input motion in response to rotation of said camshaft; one of said engine poppet valves for each of said plurality of combustion chambers comprising a deactivating engine poppet valve and being operably associated with a valve end of a rocker arm, each of said rocker arms also including a fulcrum end disposed in engagement with a lash compensation device; each of said rocker arms includes a cam follower disposed intermediate said valve end and said fulcrum end and being operable to pivot about a fulcrum surface defined by said lash compensation device in response to said cyclical input motion, thus transmitting cyclical opening and closing motion to the respective one of said deactivating engine poppet valves; each of said lash compensation devices comprising a body member fixed relative to said cylinder head, a plunger assembly defining said fulcrum surface and being moveable relative to said body member, and a latch member moveable between a latched condition and an unlatched condition in which said plunger assembly is freely reciprocable relative to said body member; characterized by:
(a) each of said plurality of lash compensation devices includes a spring member biasing said latch member toward one of said latched and unlatched conditions;
(b) an elongated actuation member disposed adjacent each of said plurality of lash compensation devices and including a portion operable to move each of said plurality of said latch members toward the other of said latched and unlatched conditions, in response to actuating movement of said an actuation member.

2. A valve control system as claimed in claim 1, characterized by said actuating movement comprises rotational movement of said actuation member, between a first rotational orientation corresponding to said latched condition, and a second rotational orientation corresponding to said unlatched condition.

3. A valve control system as claimed in claim 1, characterized by said system further comprising a single rotary actuator operable to rotate said elongated actuation member between a first and a second rotational orientations.

4. A valve control system as claimed in claim 1, characterized by said one of said deactivating engine poppet valves for each of said plurality of combustion chambers comprises said intake poppet valves.

5. A valve control system as claimed in claim 4, characterized by, for each of said plurality of combustion chambers, there is a first and a second intake poppet valve, and said first intake poppet valves comprise said plurality of deactivating engine poppet valves.

6. A valve control system as claimed in claim 5, characterized by, on each of said plurality of lash compensation devices, said spring member biases said latch member toward said unlatched condition, and said actuating movement of said elongated actuation member moves all of said plurality of said latch members toward said latched condition.

7. A valve control system as claimed in claim 6, characterized by said elongated actuation member having an unactuated position, in which each of said plurality of said spring members is permitted to bias said latch members toward said unlatched condition when said internal combustion engine is operating below a predetermined engine speed.

8. A valve control system as claimed in claim 7, characterized by said elongated actuation member having an actuated position, in which the force of each of said plurality of spring members is overcome to move said latch members toward said latched condition when said internal combustion engine is operating above a predetermined engine speed.

9. A valve control system as claimed in claim 1, characterized by each of said plurality of lash compensation devices comprises a hydraulic lash adjuster, said plunger assembly including a hydraulic lash compensation element.

10. A valve control system as claimed in claim 9, characterized by said plunger assembly includes a ball plunger portion comprising said fulcrum surface.

11. A valve control system is claimed in claim 1 characterized by said actuating movement comprises linear, reciprocable movement of said actuation member between a first orientation, corresponding to said latched condition, and a second orientation, corresponding to said unlatched condition.

12. A deactivating-type hydraulic lash compensation device for use in a valve control system of an internal combustion engine including an engine poppet valve for controlling the flow to and from a combustion chamber; said lash compensation device comprising a body member adapted to be received within a bore defined by a housing, said body member being fixed relative to said housing; a plunger assembly being moveable relative to said body member, in a direction parallel to the axis of the device, and a latch member being moveable radially, relative to the axis, between a latched condition and an unlatched condition in which said plunger assembly is freely reciprocable relative to said body member, a spring member biasing said latch member toward one of said latched and unlatched conditions; characterized by:
(a) said spring member being disposed, at least partially, external to said body member, and including one portion thereof fixed relative to said body member, and another portion thereof fixed to move radially with said latch member;
(b) said spring member biasing said latch member radially outward, relative to the axis of the device, toward said unlatched condition; and
(c) an actuation member disposed adjacent said another portion of said spring member, and moveable between a first position engaging said another portion of said spring member and moving said latch member to said latched condition, and a second position, out of operable engagement with said another portion of said spring member, permitting said latch member to be biased by said spring member to said unlatched condition.

13. A deactivating-type hydraulic lash compensation device as claimed in claim 12, characterized by said bore encompassing said body member about less than its entire circumference, thus providing an open area adjacent said body member, said another portion of said spring member being disposed within said open area.

14. A deactivating-type hydraulic lash compensation device as claimed in claim 12, characterized by said another portion of said spring member comprises an elongated spring portion extending generally parallel to the axis of the lash compensation device, said one portion of said spring member having seated there against a lower end of a lost motion spring, and a vertically upper end portion, and a vertically upper end portion of said spring member being fixed relative to said latch member.

* * * * *